United States Patent [19]
Anderson

[11] Patent Number: 5,997,150
[45] Date of Patent: Dec. 7, 1999

[54] MULTIPLE EMITTER ILLUMINATOR ENGINE

[75] Inventor: Charles H. Anderson, Dallas, Tex.

[73] Assignee: Texas Instruments Incorporated, Dallas, Tex.

[21] Appl. No.: 08/738,386

[22] Filed: Oct. 25, 1996

[51] Int. Cl.⁶ .................................................. F21V 13/00
[52] U.S. Cl. .................... 362/227; 362/235; 362/246; 362/268; 362/800
[58] Field of Search .................... 362/227, 235, 362/246, 224, 268, 33, 800

[56] References Cited

U.S. PATENT DOCUMENTS

| | | | |
|---|---|---|---|
| 3,535,507 | 10/1970 | Sugino | 362/32 |
| 4,787,013 | 11/1988 | Sugino et al. | 362/32 |
| 4,893,223 | 1/1990 | Arnold | 362/252 |
| 5,032,960 | 7/1991 | Katoh | 362/240 |
| 5,041,851 | 8/1991 | Nelson | 346/160 |
| 5,105,207 | 4/1992 | Nelson | 346/160 |
| 5,151,718 | 9/1992 | Nelson | 346/160 |
| 5,159,485 | 10/1992 | Nelson | 359/291 |
| 5,174,649 | 12/1992 | Alston | 362/244 |
| 5,461,410 | 10/1995 | Venkateswar et al. | 347/240 |
| 5,461,411 | 10/1995 | Florence et al. | 347/240 |
| 5,467,146 | 11/1995 | Huang et al. | 348/743 |
| 5,680,257 | 10/1997 | Anderson | 359/727 |
| 5,704,700 | 1/1998 | Kappel et al. | 353/31 |

*Primary Examiner*—Sandra O'Shea
*Assistant Examiner*—Michael J. Smith
*Attorney, Agent, or Firm*—Charles A. Brill; Frederick J. Telecky, Jr.; Richard L. Donaldson

[57] ABSTRACT

An optical illumination system (10, 60, 70, 80, 100, 110, 120) producing a light beam (28) having uniform illumination over a rectangular or non-symmetrical area. An array of light emitting elements (24, 102) generate light which is condensed to a single focal point F, such as by an aspheric (42) or achromatic (104, 106) lens. A holographic diffuser (16) diffuses this light, and a cylindrical lens (18) vertically compresses the light. The light output from the condensing lens is very near the sum of the light output from the individual light emitting elements. The light emitting elements can be LEDs (24) arc lamps or incandescent lamps (102). With any attenuation in light intensity from the light emitting elements (24, 102), the entire light beam (28) output is reduced uniformly, with no localized image plane degradation being generated. The present invention finds use in printing engines, such as those for xerographic printers, and display systems such as projectors and televisions.

33 Claims, 5 Drawing Sheets

5,997,150

MULTIPLE EMITTER ILLUMINATOR ENGINE

CROSS REFERENCE TO RELATED APPLICATIONS

Cross reference is made to the following commonly assigned co-pending patent applications, the teachings of which are incorporated herein by reference:

| SERIAL # | NAME | FILED |
|---|---|---|
| 08/371,348 | DMD Modulated Continuous Wave Light source for Xerographic Printer | 01-11-95 |
| 08/221,739 | Illumination Control Unit for Display System with Spatial Light Modulator | 3-31-94 |
| 07/809,996 | System and Method for Achieving Gray Scale Spatial Light Modulator Operation | 12-18-91 |
| 60/007,034 | Illumination System for HardCopy Apparatus | 10-25-95 |

TECHNICAL FIELD OF THE INVENTION

This invention relates generally to an image display system such as a xerographic printer, and more particularly, to an illumination system providing a light beam having a uniform distribution of high-intensity light to a spatial light modulator.

BACKGROUND OF THE INVENTION

Semiconductor spatial light modulators (SLM's) are one viable solution to realizing high quality, affordable xerographic printers. One promising SLM technology suitable for both printers and displays is the deformable mirror device or digital micromirror device (collectively DMD) manufactured by Texas Instruments Incorporated of Dallas, Tex. The DMD is a monolithic semiconductor device having a linear or area array of bi-stable movable micromirrors fabricated over an array of corresponding addressing memory cells. One embodiment of a xerographic printer implementing a tungsten light source focused via optics on an imaging DMD mirror array is disclosed in U.S. Pat. No. 5,041,851 to Nelson, entitled "Spatial Light Modulator Printer and Method of Operation", assigned to the same assignee as the present application and the teachings included herein by reference.

In a xerographic printer or display system implementing an imaging DMD spatial light modulator, it is desired to uniformly illuminate the elongated DMD mirror array (typically about 7 inches in length for a printer) with a homogeneous light source such that each pixel mirror of the array modulates a uniform intensity portion of light. For a printer, this is necessary because the DMD mirror array modulates this light to expose a light sensitive rotating organic printing drum, whereby the intensity and duration of the modulated light directed thereon determines the relative exposure of the charged drum. The exposed portion of the drum comprises a latent image, wherein a quantity of toner will adhere to the drum image, this toner then being transferred to a printing medium such as paper, and fused thereon using heat.

It is also necessary that the energy of the light directed upon the DMD mirror array be of sufficient flux per unit area to fully expose the rotating printing drum to obtain a dark image. If insufficient light energy is modulated and directed to the drum by the DMD mirror array, the printing drum may not be fully exposed, thus degrading the contrast of the image printed on a printing medium.

U.S. Pat. No. 5,159,485 to Nelson, entitled "System and Method for Uniformity of Illumination for Tungsten Light", assigned to the same assignee of the present invention and the teachings included herein by reference, discloses an anamorphic optical path arranged such that the vertical component of the source light is compressed to match the physical shape of the DMD mirror array. The embodiment disclosed dramatically increases the optical efficiency of the system, whereby light energy is compressed to irradiate the DMD mirror array more intensely from a given light source, such as a tungsten lamp.

U.S. Pat. No. 5,151,718 to Nelson, entitled "System and Method for Solid State Illumination for DMD Devices", also assigned to the same assignee of the present invention and the teachings included herein by reference, discloses an array of LED emitters constructed to efficiently replace the conventional tungsten source lamp. The LED array is geometrically configured, and can be electrically operated by strobing to vary the brightness of light to individual mirror pixels to achieve gray scale imaging, and reduce fuzzy line images. Each of the LED's in the array can be provided with a lens to help columnate the light through optics and onto the DMD mirror array. Using LED's, light is efficiently directed and focused onto the DMD mirror array, with little light being wasted and directed elsewhere. Less optical energy is required of the light source compared to a conventional tungsten lamp to illuminate the DMD mirror array with a particular light intensity. The LED's can be quickly turned on and off, thereby providing the ability to modulate the light energy directed upon the DMD mirror array, and consequently, helps achieve gray scale printing. For instance, during a given line print cycle, the LED can be on for 50% of the cycle time to irradiate the DMD array with half the light energy available for that particular time interval. The alignment of the optics is critical to ensure that the energy of each LED is directed upon the DMD mirror array. That is to say, the LED array may not produce sufficient and uniform light energy should one LED fail or have a reduced output.

U.S. Pat. No. 5,105,207 to Nelson, entitled "System and Method for Achieving Gray Scale DMD Operation", assigned to the same assignee as the present invention and the teachings incorporated herein by reference, discloses a system for enhancing resolution of a xerographic process by submodulation of each individual pixel. The submodulation is achieved by anamorphically reducing the square pixel presentation of light rays to a rectangle having a number of controllable segments within each square pixel scanned line. A conventional tungsten lamp is incorporated in this embodiment.

It is desirable to provide a low cost, high intensity optical system whereby the elongated DMD mirror array can be uniformly illuminated with high intensity light. Moreover, it is desirable to provide a high intensity light source which can be modulated in intensity to effect gray scale printing and display. The optical system should be easy to align, whereby any degradation in the light source would be uniformly presented to the DMD array, and would not noticeably degrade the printing quality of the xerographic printer or be visually noticeable when imaged in a display.

SUMMARY OF THE INVENTION

The present invention achieves technical advantages as an illumination system by implementing an array of light emitting elements each focused to a focal point, with optics positioned proximate the focal point generating a light beam having a uniform distribution of light. According to the present invention, the reduction or loss of light from one or more of the light emitting elements generates a uniform reduction in the beam light output and there is no localized change in image plane intensity. The light output of the light emitting elements is effectively mixed, whereby the light output of the illumination system is near the sum of the light output from the individual light emitting elements. A condenser lens is positioned proximate the area array of light emitting elements to focus the light therefrom to the single focal point.

The illumination system of the present invention comprises a light source comprised of an array of light emitting elements. A condenser lens is positioned proximate the element array and focuses light from the light emitting elements to a focal point. Optics are positioned proximate the condenser lens and receive the condensed light proximate the focal point, generating a light beam having a uniform distribution of light. The optics preferably comprise a light integrator, with a holographic diffuser provided proximate the focal point to uniformly diffuse the light before it is passed to an anamorphic lens. The focal point is preferably on a central axis defined by the area array of light emitting elements. The condenser lens is preferably comprised of an aspheric lens, but could also comprise of Fresnel lens, a conical light integrator, an achromatic lens, or an equivalent thereof. The array of light emitting elements is preferably a circular area array or a linear array, however, other uniform geometric configurations could be utilized as well. The area array of light emitting elements may be arranged together on a concave orientation.

A housing is preferably utilized having a plurality of recesses. One of the light emitting elements is mounted within each of the recesses, these recesses collimating the light emitted from the light emitting element and directing the light to the condenser lens.

Preferably, the light emitting elements comprise of LEDs for printers and arc lamps or incandescent lamps for high intensity display systems.

The illumination system according to the present invention provides a uniform intensity, homogenized beam of light illuminating a spatial light modulator having a rectangular or non-symmetrical area. The present invention is relatively low cost and easy to manufacture and align.

DETAIL DESCRIPTION OF THE PREFERRED EMBODIMENT

Figure 1:
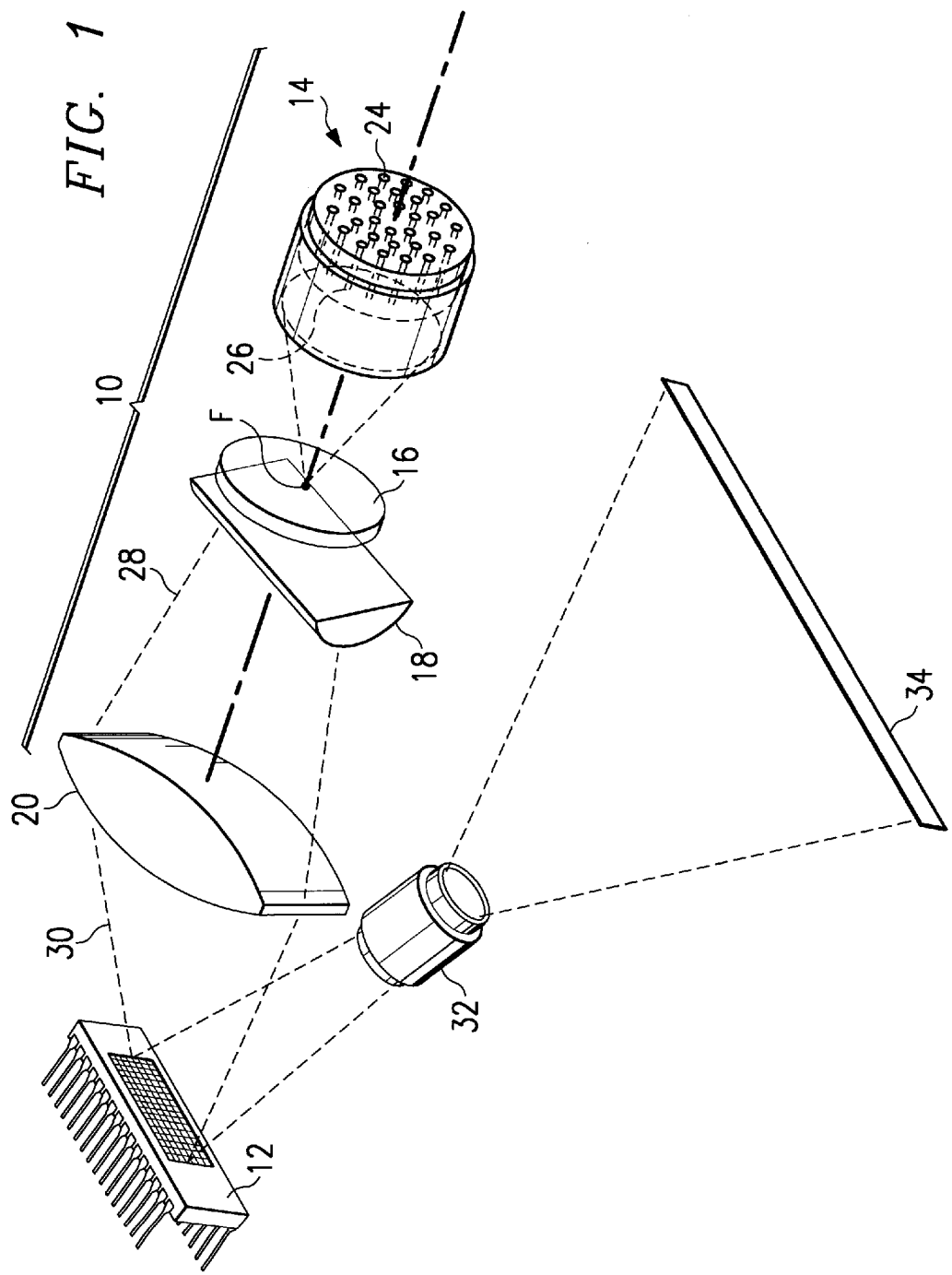
FIG. 1 is a perspective view of an illumination system according to the preferred embodiment of the invention, including an area array of light emitting elements with the light output of each element being focused to a focal point proximate a holographic diffuser.

Referring now to FIG. 1, there is shown a perspective view of an optical illumination system 10 uniformly illuminating a rectangular spatial light modulator 12, which may be comprised of a digital micromirror device (DMD) such as that manufactured by Texas Instruments Incorporated, or other suitable spatial light modulator. Illumination system 10 is seen to include a light source unit generally shown at 14 including an area array of light emitting elements, a holographic diffuser 16, a cylindrical lens 18, and an aspheric lens 20. Lens 20 is shown as a solid aspheric element, but may also be a Fresnel lens or the like which may be desirable because of its relatively thin profile. An area array of light emitting elements 24, which may each be comprised of an LED, are positioned within recesses 26 opening through light unit 14 as shown. The light output of each of the light emitting elements 24 is focused to a common focal point F, with the holographic diffuser 16 positioned at focal point F for diffusing the light. The diffused light is condensed in the vertical direction by the cylindrical lens 18, with the uniform intensity, condensed light, generally shown at 28 being directed upon the rectangular spatial light modulator 12 by the aspheric lens 20. The uniform-intensity light beam 30 illuminating spatial light modulator 12 is modulated by spatial light modulator 12, such as disclosed in the commonly assigned cross-referenced patents and patent applications, to form a light image. This light image is directed into the focal point of a projector lens 32, such as a F/5.6 lens, and focused upon the surface of an image plane 34, such as a rotating organic xerographic photoreceptor drum.

For additional teaching of using a DMD spatial light modulator in a xerographic printer and some applications of the present invention, reference is made to the commonly assigned cross reference patent applications and patent, as well as U.S. Pat. No. 5,461,411 entitled "Process and Architecture for Digital Micromirror Printer" and U.S. Pat. No. 5,461,410 entitled "Gray Scale Printing Using Spatial Light Modulators" the teachings of each incorporated herein by reference.

Figure 2:
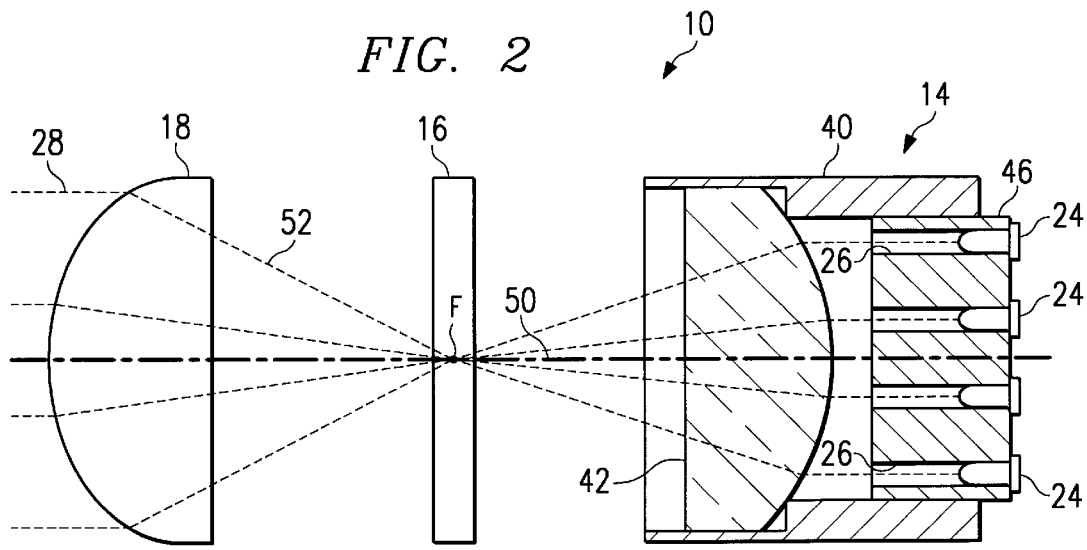
FIG. 2 is an optical diagram illustrating an aspheric condenser lens positioned proximate the area array of light emitting elements and focusing the light output therefrom to a single focal point proximate the holographic diffuser, with the diffused light being collimated by a cylindrical lens for illuminating a spatial light modulator.

Turning now to FIG. 2, an optical schematic diagram of illumination system 10 is shown. Light unit 14 is seen to comprise a tubular cylindrical housing 40 encasing and securing an aspheric condensing lens 42 therewithin. Unit 14 is also seen to include an illuminator housing 46. Housing 46 is generally circular and has a disc-like shape with the plurality of parallel recesses 26 bored therethrough, as shown. One LED 24 is secured within each one of the recesses 26 at an entrance end thereof, with the light output of each LED 24 being collimated by the respective recess 26 toward the aspheric condensing lens 42. LEDs 24 may be secured within unit 46 by adhesive, with unit 46 secured within housing 40 using adhesive or welding.

As shown, the aspheric lens 42 condenses the parallel beams of light received from each of the LEDs 24, and focuses the light therefrom to a single focal point F. Focal point F is along a common axis 50 defined by housing 46, aspheric lens 42, and the area array of LEDs 24. Holographic diffuser 16 is positioned at focal point F and diffuses the focused light thereat, this diffused light 52 being transmitted to the cylindrical lens 18, as shown. A technical advantage of the present invention is that any decrease or loss in light output of any one or several LEDs 24 will result in a uniform decrease in the light intensity of beam 52 transmitted to the cylindrical lens 18. That is to say, there is no localized image plane degradation when any on-axis or off-axis LED attenuations are produced. With LED light attenuation, the entire image plane degrades uniformly. This is especially desirable when illuminating the elongated rectangular spatial light modulator 12 which requires uniform illumination to effectively illuminate image plane 34.

Figure 3:
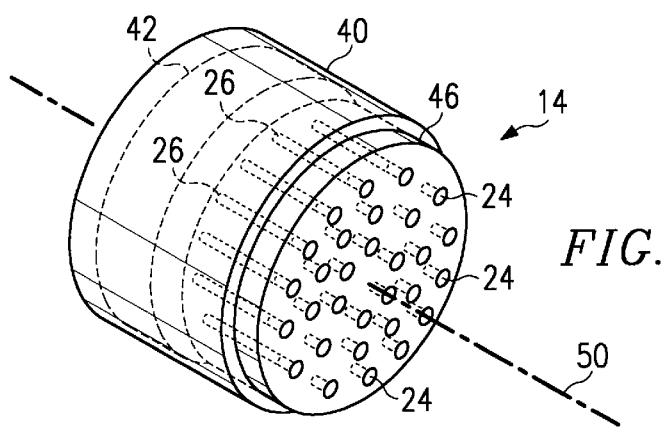
FIG. 3 is a perspective view of the housing and an array of parallel recesses extending therethrough, each recess holding an associated LED and collimating the light therefrom.

Referring to FIG. 3, a perspective view of illumination unit 14 is shown to illustrate the generally circular area array of LEDs 24 within housing unit 46. The LEDs 24 are shown to be uniformly positioned about the central axis 50 so as to generally uniformly irradiate the aspheric condensing lens 42. However, other uniform geometric distributions of light emitting elements 24 could be utilized as well, such as a hexagonal array of LEDs 24, and limitation to a circular array of LEDs is not to be inferred.

Figure 4:
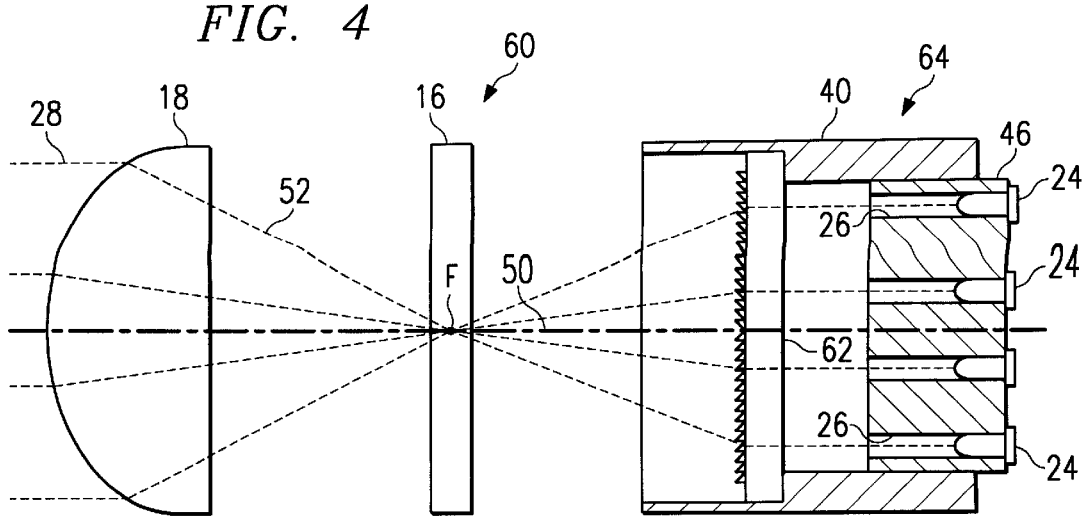
FIG. 4 is an optical diagram of an alternative preferred embodiment illustrating a fresnel lens condensing the light from the array of light emitting elements to a single focal point.

Referring now to FIG. 4, there is shown an illumination system 60 according to an alternative preferred embodiment of the present invention. Illumination system 60 is identical to illumination system 10 as shown in FIG. 1 and FIG. 2, with the exception that a Fresnel lens 62 is utilized within a light unit 64 in place of the condensing lens 42 shown in FIG. 2. Fresnel lens 62 receives the parallel beams of incident light from each of the LEDs 24 and focuses the light to the single focal point F. The advantage of implementing a Fresnel lens 62 in place of lens 421 is its reduced cost and reduced thickness.

Figure 5:
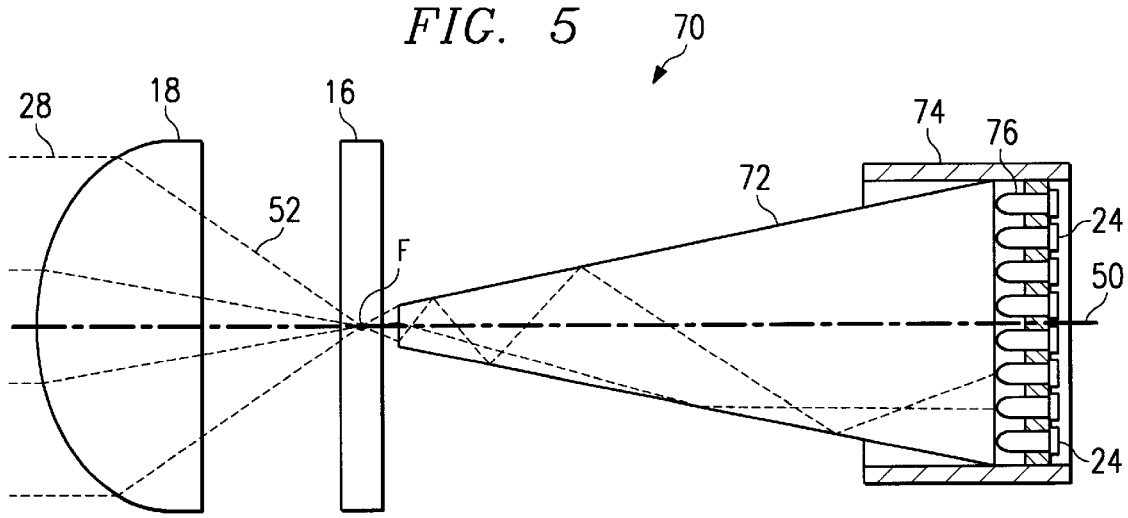
FIG. 5 is an optical diagram of another alternative embodiment of the present invention illustrating a conical light integrator utilized as a condensing lens for focusing the light from the array of light emitting elements to a single focal point.

Referring now to FIG. 5, there is shown an illumination system 70 according to yet another alternative embodiment of the present invention. Illumination system 70 is also substantially identical to system 10 shown in FIG. 1 and FIG. 2, with the exception that a conical lens 72 is utilized in light unit 74 in place of the aspheric condensing lens 42. Conical lens 72 also focuses the parallel beams of incident light from the array of LEDs 24 to the single focal point F, as shown. The tips of LED's 24 abut the incident surface of integrator 72 to directly couple the light into the light integrator. If desired, LED's without spherical lenses, such as shown at 76, can have the flat tips thereof abut the flat surface of the integrator and be affixed thereto using lens-grade epoxy so that the LED is actually a physical part of the integrator. This helps couple the light energy directly into the light integrator. Diffuser 16 is preferably a spherical diffuser, and may or may not be implemented as desired to further homogenize the light. An advantage of utilizing a conical lens 72 is the additional integration of the individual beams. In the alternative embodiments shown in FIGS. 4 and FIG. 5, the holographic diffuser 16 is also positioned closely proximate, and preferably at, focal point F, with the cylindrical lens 18 being utilized to vertically compress the transmitted diffused light 52 toward the aspheric lens 20. Aspheric lens 20 serves to further direct the uniform intensity light beam 30 to illuminate the rectangular spatial light modulator 12, as shown in FIG. 1.

Figure 6:
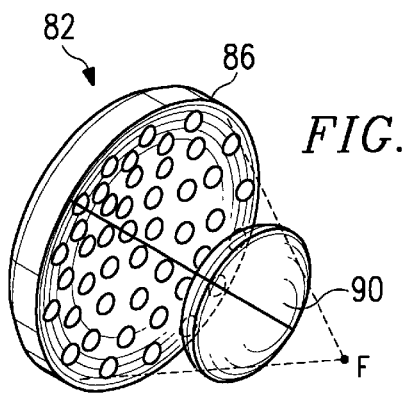
FIG. 6 is a perspective view of another alternative embodiment illustrating a concave light unit.
Figure 7:
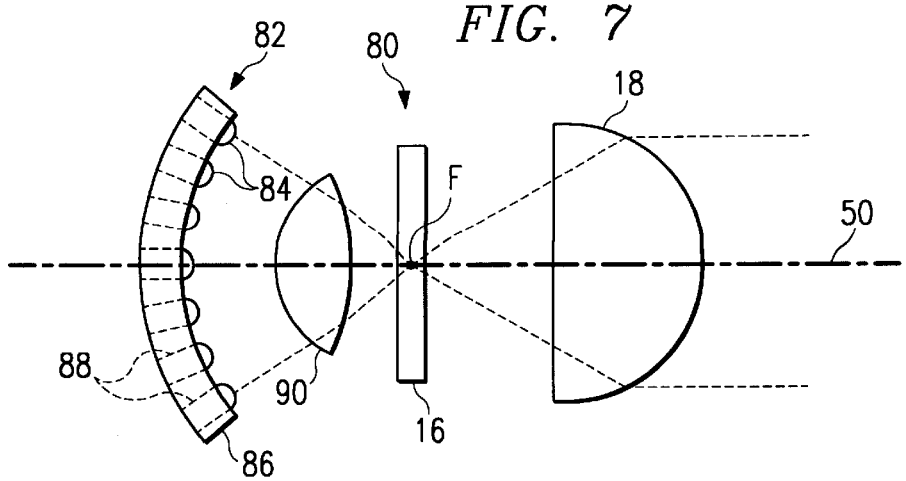
FIG. 7 is an optical diagram of the embodiment of FIG. 6, illustrating the compact illumination system.

Referring now to FIG. 6 and FIG. 7 there is shown an illumination system 80 having a concave light unit 82 including a circular area array of LED's 84. A concave housing 86 has an array of openings 88, each opening 88 holding one LED 84. The axis of each opening 88 is oriented such that the light from each LED 84 intersects and is focused at focal point F after being focused by an aspheric condensing lens 90. Lens 90 may be solid, as shown, but may also be a Fresnel lens or another lens which condenses the incident beams of light from the concave array of LEDs to point F. Compared to the flat-array light unit 14 of FIG. 2, light unit 82 has reduced chromatic beam distortion from LEDs at the edges of the array, and is compact in the axial direction. With the concave orientation of light unit 82, use of lens 90 is optional.

Figure 8:
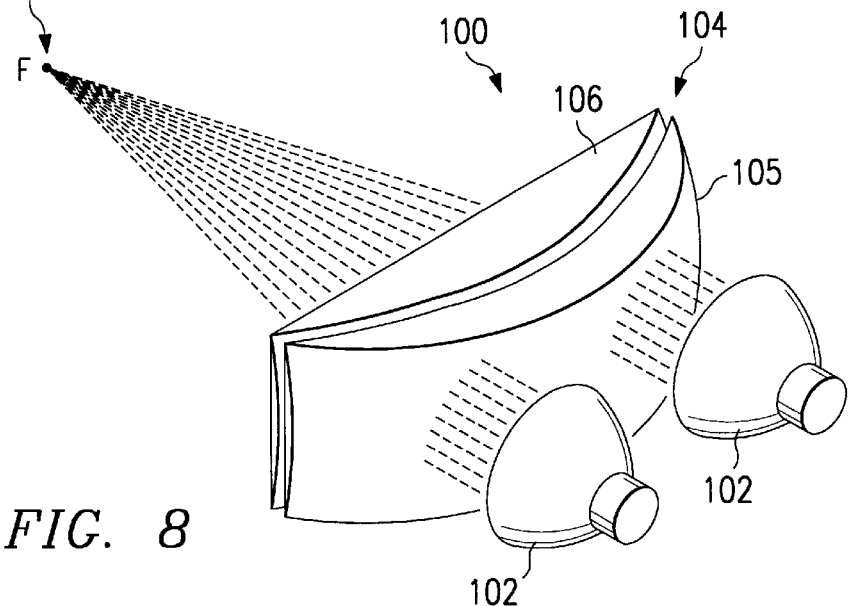
FIG. 8 is a perspective view of another alternative embodiment of the present invention suited for high intensity display systems illustrating a pair of arc lamps arranged in a linear array focused by a truncated achromatic lens to a common focal point.

Referring now to FIG. 8, there is shown an illumination system 100 which produces an exceptionally high intensity uniform light beam suitable for display systems including projectors and televisions. Light sources 102 in this embodiment are preferably arc lamps, but can be conventional incandescent lamps if desired. A linear array of lamps 102 each provide a high intensity light beam, which beams are focused to a common focal point F. The optics for focusing the light beams from lamps 102 comprises a truncated rotationally-symmetric achromatic lens generally shown at 104, comprising in combination a pyrex or crown glass aspheric lens 105 mated with a spherical flint element 106. The aspheric lens 105 is comprised of a pyrex or crown material that is a less dense glass. The flint element 106 is comprised of a more dense glass material. The dual elements 105 and 106 provides color-corrected focus for the multiple wavelengths of light emitted by lamps 102. That is, for the different wavelengths of light emitted by lamps 102, the flint element 106 ensures that all colors are focused at a common focal point F. Lens 106 is not necessary, but preferable to ensure a common focus for all wavelengths of light.

Figure 9:
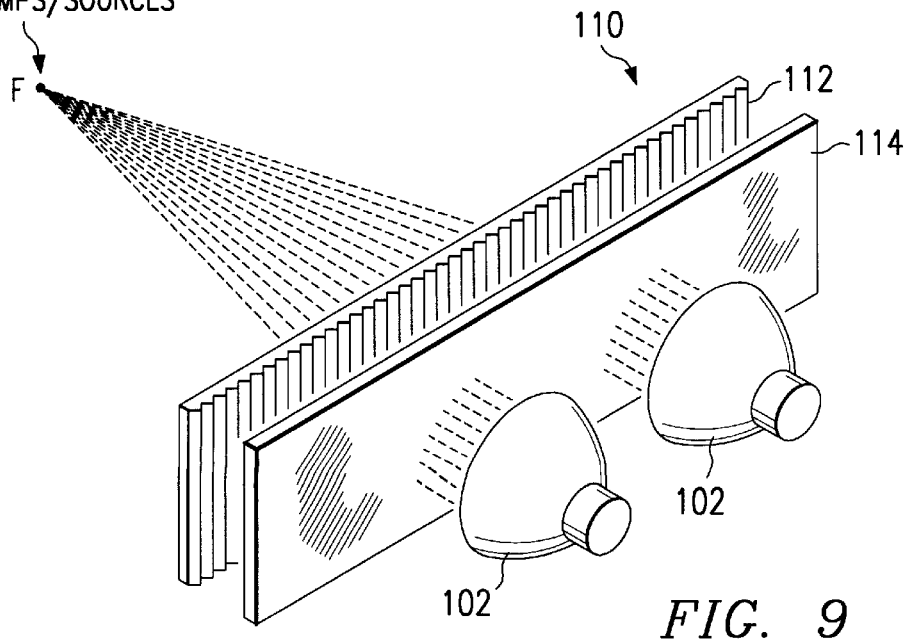
FIG. 9 is a perspective view of another alternative embodiment of the present invention illustrating a pair of arc lamps arranged in a linear array focused by a Fresnel lens to a common focal point.

In this embodiment, the light emitted by lamps 102 is diffused light, and thus a diffuser element is not necessary, but could be used if desired. The system 100 shown in FIG. 8 includes a linear array of light sources, shown as two light sources, although multiple i.e. more than two lamps could be utilized if desired. Referring to FIG. 9, there is shown an illumination system 110 that is functionally similar to the system 100 shown in FIG. 8, but wherein a Fresnel lens 112 is used in place of the aspheric/achromatic lens. A heat absorbing glass window 114 absorbs some of the infra-red heat from lamps 102, whereby the light transmitted by window 114 is focused by Fresnel lens 112 to a common focal point F. The advantage of this system is the compactness of the optics and it is relatively inexpensive. However, the Fresnel lens does not provide color correction of the light as provided by the flint lens 106 in FIG. 8. While two lamps sources 102 are shown in a linear array, multiple i.e. more than two lamps could be utilized if desired. Again, lamps 102 can be high energy arc lamps or incandescent lamps providing homogenized light, and thus, a light diffuser is normally not required in this embodiment as well.

Figure 10:
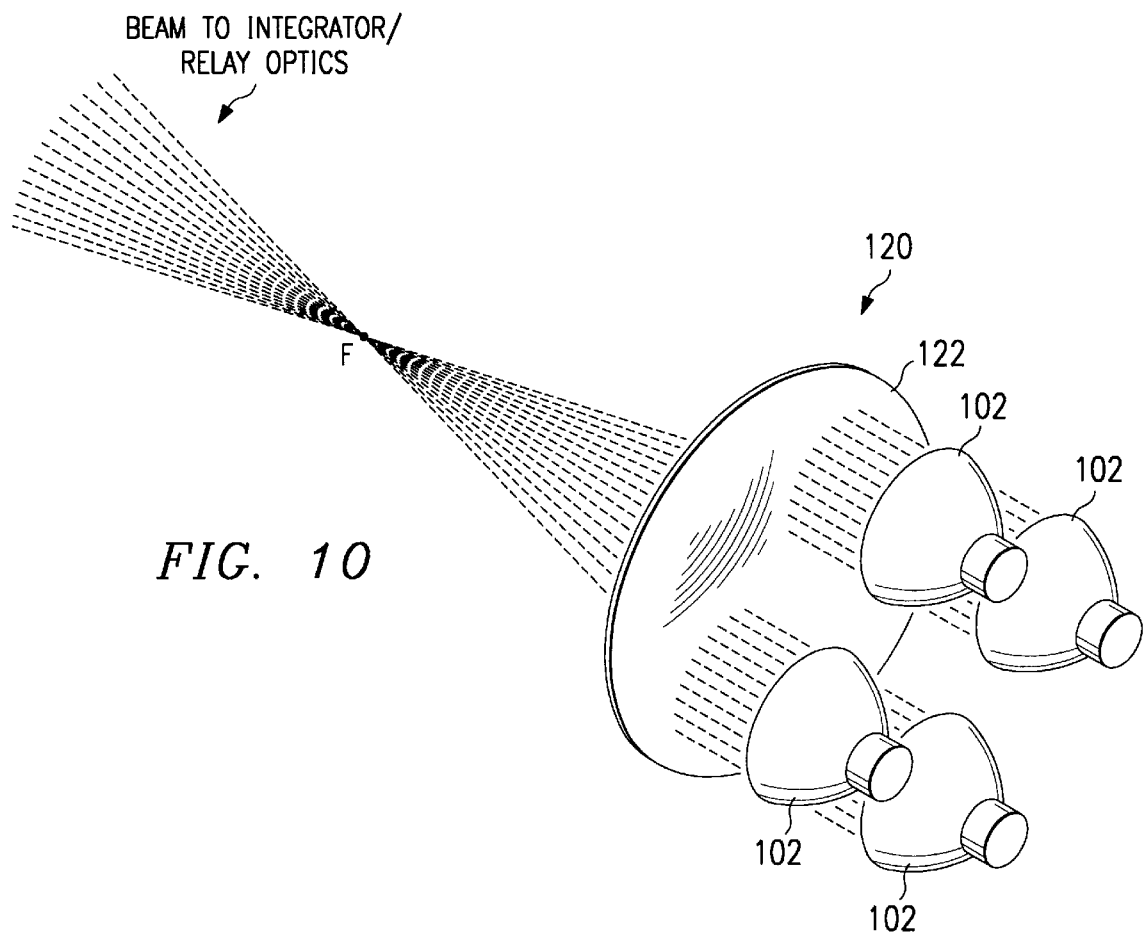
FIG. 10 is a perspective view of another alternative embodiment of the present invention illustrating an area array of arc lamps focused by a non-truncated aspheric lens to a common focal point.

Referring now to FIG. 10, there is shown yet another alternative embodiment of the present invention. An illumination system 120 is shown including an area array of lamps 102 in combination with an aspheric lens 122, which is not truncated as was shown in FIG. 8. In this embodiment, multiple lamps 102 are provided in a generally square or rectangular configuration, as shown. Aspheric lens 122 focuses the light from each of these light elements 102 to a common focal point F. This focused beam of light is subsequently directed into an integrator/relay optics for ultimately illuminating an imaging spatial light modulator. Aspheric lens 122 may be achromatic, as shown in FIG. 8, and include a flint element to provide a color corrected focus of the multiple wavelengths of light to focal point F. If an integrator is chosen to be used, the integrator would further homogenize the already somewhat diffused light emitted by the multiple lamps 102.

Figure 11:
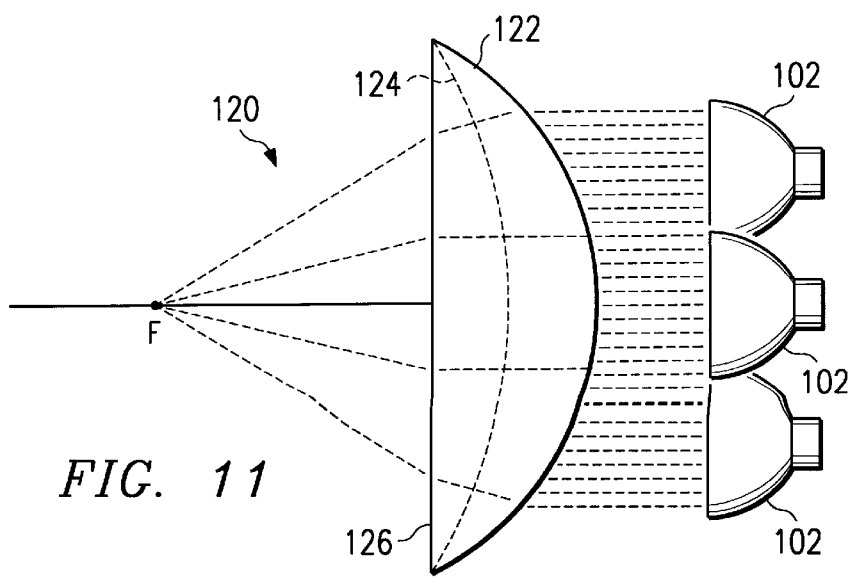
FIG. 11 is an optical diagram of the embodiment shown in FIG. 10 illustrating the optional inclusion of an achromatic focusing lens.

Referring to FIG. 11, there is shown a side view of the illumination system 120 shown in FIG. 10. As shown, lamps 102 are oriented to direct collimated beams of light to the aspheric converging lens 122. The aspheric converging lens 122 focuses these beams of light to a common focal point F, providing illumination at F that is 4× that of that light generated by an individual lamp 102. If desired, a flint or more dense element 124, shown in phantom, could be used in combination with aspheric lens 122 to form an achromatic lens. The rear surface 126 of lens 122 is shown as flat, but may be slightly convex or slightly concave if desired to optimize the focal length of the illumination system. While four lamp sources are shown, additional lamp sources 102 could be utilized and configured in a regular pattern to increase the light output and thus the summed intensity at focal point F. This arrangement allows the light output of multiple light sources to be summed and converged at a single focal point F.

The present invention achieves technical advantages as an illumination system producing a uniform beam of light over a rectangular or non-symmetrical area, such as a spatial light modulator comprising a DMD as shown in FIG. 1. Should the light output of one or more of the multiple LEDs 24 or lamps 102 be reduced or lost, the entire image plane intensity degrades uniformly. In other words, no local image plane degradation is experienced when any one, or a combination of, on-axis and off-axis light element attenuation occur. The condensing lenses truly "mix" the light received from the array of light sources and focuses the light to a common focal point F. The light intensity at focal point F is very near the sum of all the lamp outputs. Although LEDs and conventional lenses are used for the present invention for printer systems and arc lamps/incandescent lamps are used for high power display systems, other sources of radiation and non-imaging optical condensers/integrators can be used.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. An illumination system comprising:
    a light source comprised of a generally circular array of light emitting elements;
    a condenser lens positioned proximate said element array focussing light from said light emitting elements to a focal point; and
    an optical element positioned proximate receiving said condensed light proximate said focal point and generating a light beam having a uniform distribution of light.

2. The system as specified in claim 1 said optical element comprising a light integrator.

3. The system as specified in claim 1 said optical element including a holographic diffuser proximate said focal point.

4. The system as specified in claim 1 wherein said focal point is on a central axis defined by said array of light emitting elements.

5. The system as specified in claim 1 wherein said condenser lens comprises an aspheric lens.

6. The system as specified in claim 1 wherein said condenser lens comprises a Fresnel focusing lens.

7. The system as specified in claim 1 wherein said condenser lens comprises a conical light integrator.

8. The system as specified in claim 1 wherein said array of light emitting elements are arranged together as an area array in a concave orientation.

9. The system as specified in claim 1 further comprising a housing having a plurality of recesses, one said light emitting element being mounted within each said recess, said recesses collimating light emitted by said light emitting elements.

10. The system as specified in claim 1 wherein said light emitting elements comprise of LEDs.

11. The system as specified in claim 1 further comprising a spatial light modulator modulating said light beam having a uniform distribution of light.

12. The system as specified in claim 11 further comprising a projector lens receiving said modulated light from said spatial light modulator.

13. The system as specified in claim 1 wherein said light emitting elements comprise either of arc lamps or incandescent lamps.

14. The system as specified in claim 1 said optical element comprising an achromatic lens.

15. The system as specified in claim 1 wherein said light emitting elements are arranged as a linear array.

16. The system as specified in claim 1 wherein said condenser lens comprises a truncated achromatic lens.

17. An illumination system comprising:
    a light source comprised of a generally circular concave array of light emitting elements; and
    an optical element positioned proximate said light source receiving said light form said concave array and generating a light beam having a uniform distribution of light.

18. The system as specified in claim 17 further comprising an aspheric lens positioned between said concave array of elements and said optical element.

19. The system as specified in claim 18 further comprising a light diffuser at a focal point of said aspheric lens.

20. An illumination system comprising:
    a light source comprised of an array of arc lamps or incandescent lamps;
    a condenser lens positioned proximate said element array focussing light from said lamps to a focal point; and
    an optical element positioned receiving said condensed light proximate said focal point and generating a light beam having a uniform distribution of light.

21. The system as specified in claim 20, said optical element comprising a light integrator.

22. The system as specified in claim 20, said optical element comprising a holographic diffuser proximate said focal point.

23. The system as specified in claim 20, said focal point on a central axis defined by said array of light emitting elements.

24. The system as specified in claim 20, said condenser lens comprising an aspheric lens.

25. The system as specified in claim 20, said condenser lens comprising a Fresnel focusing lens.

26. The system as specified in claim 20, said condenser lens comprising a conical light integrator.

27. The system as specified in claim 20, said array of lamps configured as a generally circular area array.

28. The system as specified in claim 20, said array of lamps arranged together as an area array in a concave orientation.

29. The system as specified in claim 20, further comprising a spatial light modulator modulating said light beam having a uniform distribution of light.

30. The system as specified in claim 29, further comprising a projector lens receiving said modulated light from said spatial light modulator.

31. The system as specified in claim 20, said optical element comprising of an achromatic lens.

32. The system as specified in claim 20, said lamps arranged as a linear array.

33. The system as specified in claim 20, said condenser lens comprising a truncated achromatic lens.

* * * * *

UNITED STATES PATENT AND TRADEMARK OFFICE
CERTIFICATE OF CORRECTION

PATENT NO. : 5,997,150
DATED : December 7, 1999
INVENTOR(S) : Charles H. Anderson It is certified that error appears in the above-indentified patent and that said Letters Patent is hereby corrected as shown below:

Cover Page, insert Item [60] under Related U.S. Application Data

--Provisional Application No. 60/007,041  Oct. 25, 1995.--

Signed and Sealed this

Twentieth Day of March, 2001

Attest:

NICHOLAS P. GODICI

*Attesting Officer*     Acting Director of the United States Patent and Trademark Office